United States Patent [19]

Rohrberg

[11] 4,379,215
[45] Apr. 5, 1983

[54] ORBITAL CASSETTE WELDING HEAD

[76] Inventor: Roderick G. Rohrberg, 3121 Fujita St., Torrance, Calif. 90505

[21] Appl. No.: 249,092

[22] Filed: Mar. 30, 1981

[51] Int. Cl.$^3$ .............................................. B23K 9/225
[52] U.S. Cl. ................................... 219/60 A; 219/161; 228/29
[58] Field of Search ............... 219/60 A, 161; 228/45, 228/29

[56] References Cited

U.S. PATENT DOCUMENTS

| | | | |
|---|---|---|---|
| 3,238,347 | 1/1966 | Rohrberg | 219/60 A |
| 3,702,913 | 11/1972 | Kazluaskas | 219/60 A |
| 3,823,298 | 7/1974 | Rohrberg | 219/60 A |

*Primary Examiner*—Elliot A. Goldberg
*Attorney, Agent, or Firm*—Edward A. Sokolski

[57] ABSTRACT

An orbiting welding head for welding tubing and the like together. A U-shaped tube clamp unit has a pair of jaws in which two tubing sections to be welded together are held with the edges of such tubing sections in abutment against each other. A welder unit is incorporated in a cassette having a housing with an electrically non-conductive outer wall portion. This cassette is inserted into the U-shaped tube clamp and removably joined thereto by means of a locking ring. The welder unit has a welding electrode which protrudes from a horseshoe shaped rotatable electrode drive member. This drive member has a ball bearing support which comprises a plurality of ball members which protrude from the rotatable drive member at the opposite side faces thereof and which ride in respective grooved races formed in the main body of the cassette. The drive member is rotatably driven by means of a motor driven gear train. The welding electrode is thus rotatably driven around the interface between the tube sections to be joined together in effecting the welding operation.

8 Claims, 10 Drawing Figures

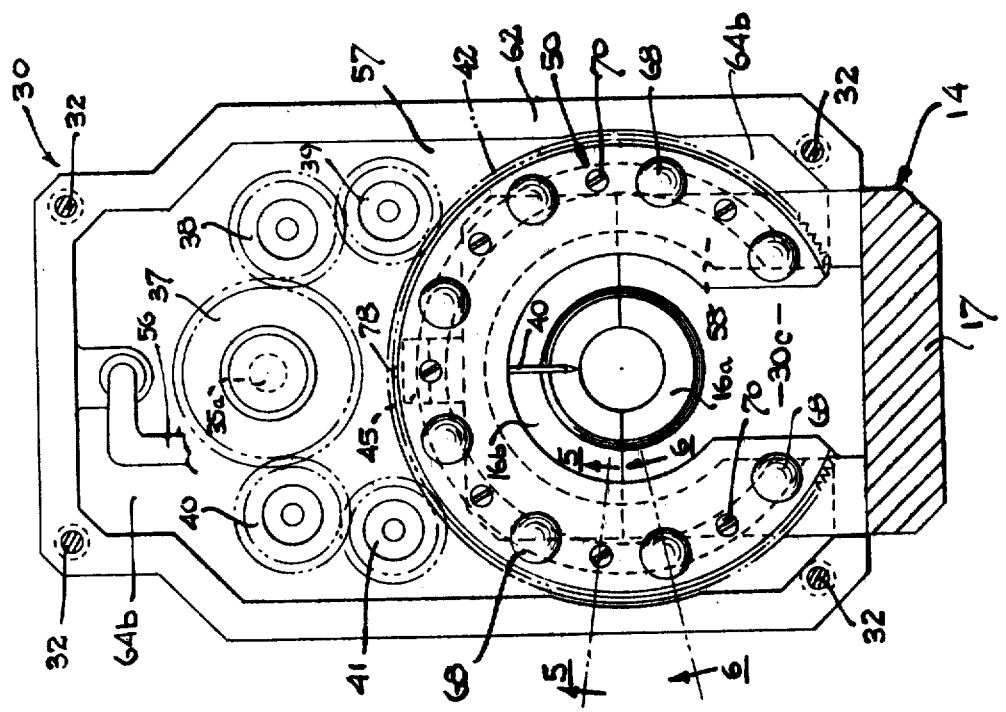
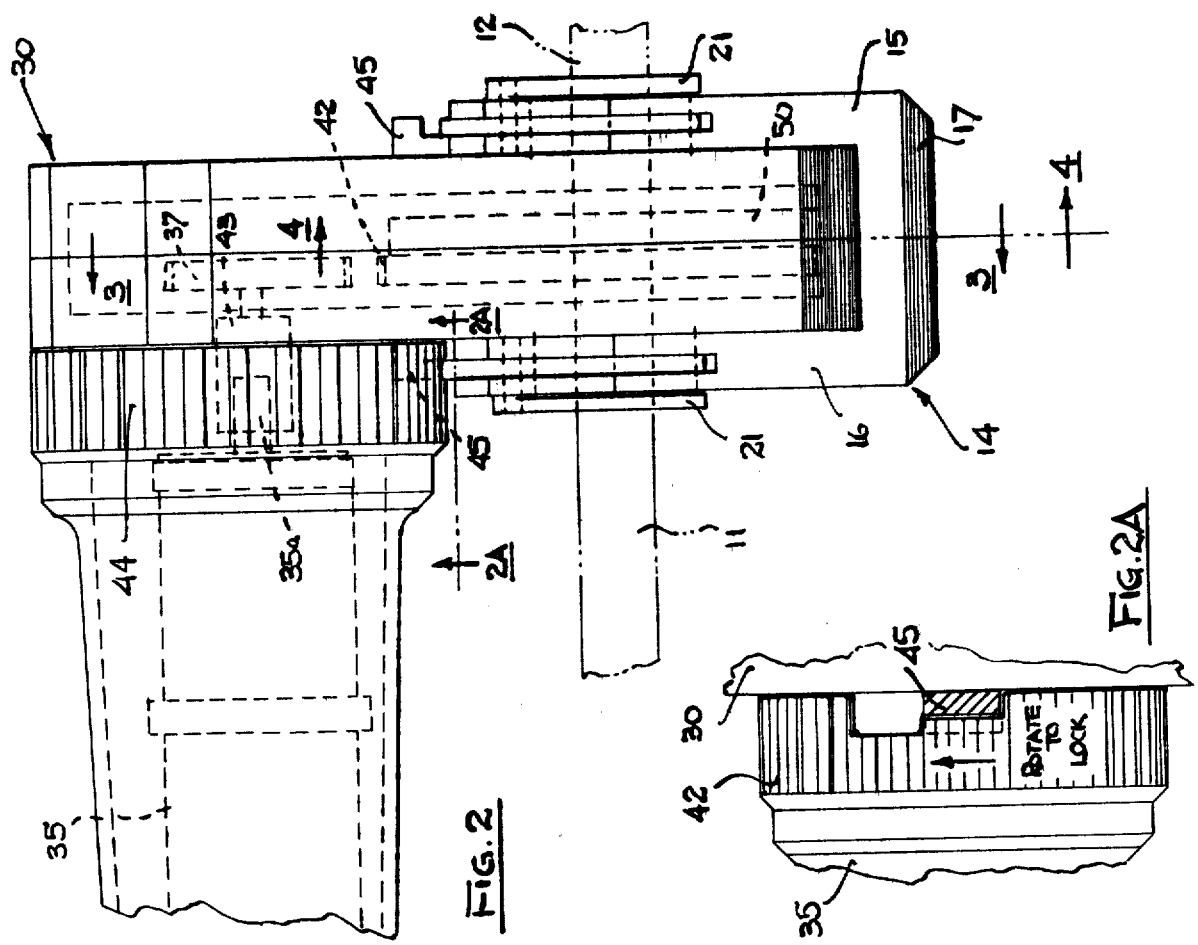

ORBITAL CASSETTE WELDING HEAD

This invention relates to electrical welders for welding together tube sections and the like, and more particularly to such a welder employing a cassette-type welding unit having an outer casing portion of electrically insulative material and a rotatable welding electrode drive member in which the welding electrode is carried and driven orbitally around the tubing interface to be welded.

Compact welding apparatus for joining together sections of tubing or the like where limited working space is available, as, for example, in aircraft assembly operations, are described in my U.S. Pat. No. 3,678,781 and U.S. Pat. Nos. 3,238,347 and 3,823,298 of which I am a co-inventor. In all of these devices, means are provided for rotatably driving the welding electrode around the interface between the tubing sections which are to be joined together in an orbital fashion in accomplishing the welding operation. These prior art devices generally employ a motor driven gear train in driving the electrode, with the tubing sections being held together in abutment by means of a clamping unit. In U.S. Pat. No. 3,823,298, the welding unit is incorporated into a cassette which is capable of being readily installed in and removed from its operating position.

Certain drawbacks have been encountered in these prior art devices. Particularly, in such devices, the welding unit is generally fabricated of an electrically conductive metal with the welding electrode being mounted in an insulating holder or mount of some type. The welding initiating voltage employed is generally at a high frequency and of a very high voltage. This, it has been found, often results in voltage breakdowns across the dielectric insulating material in which the electrode is mounted, either resulting in complete breakdown of the equipment or a lowering in its efficiency of operation. Further, the electrode drive systems employed in such prior art devices tend to be overly complicated in their construction and thus somewhat expensive to fabricate. Such complicated drive mechanisms also leave much to be desired in their reliability of operation and durability.

The welder of the present invention overcomes the aforementioned shortcomings of the prior art in the following manner. Firstly, the problem of electrical breakdown between the welding electrode and the member in which it is mounted is avoided by integrating the electrode into a metal drive ring in which it is carried and to which electrical power is fed, the outer portions of the cassette casing in which this drive ring is mounted being fabricated of an insulative material such as a suitable plastic. Secondly, a unique, low-friction ball bearing support is employed for the electrode drive ring which is both simple and economical in its construction, yet which provides a reliable low-friction bearing for this ring. This end result is achieved by means of a plurality of ball members which are mounted in the ring and which protrude from the opposite side surfaces thereof, these ball members riding in a grooved race formed in the housing. Further, the welding unit is incorporated into a cassette member which can readily be attached to and removed from the tube clamp unit by means of a locking ring.

It is therefore an object of this invention to provide an improved orbital cassette welder which has greater durability and reliability and which is of more economical construction than prior art such devices.

Further, it is an object of this invention to provide an improved orbital cassette welder which is less subject to electrical failure than similar prior art devices.

Other objects of this invention will become apparent as the description proceeds in connection with the accompanying drawings of which:

FIG. 2 is a side elevational view of the preferred embodiment;

FIG. 2A is a fragmentary view showing the clamping mechanism for attaching the welding unit to the tube clamp unit;

FIG. 3 is a cross-sectional view taken along the plane indicated by 3—3 in FIG. 2;

Figure 1:
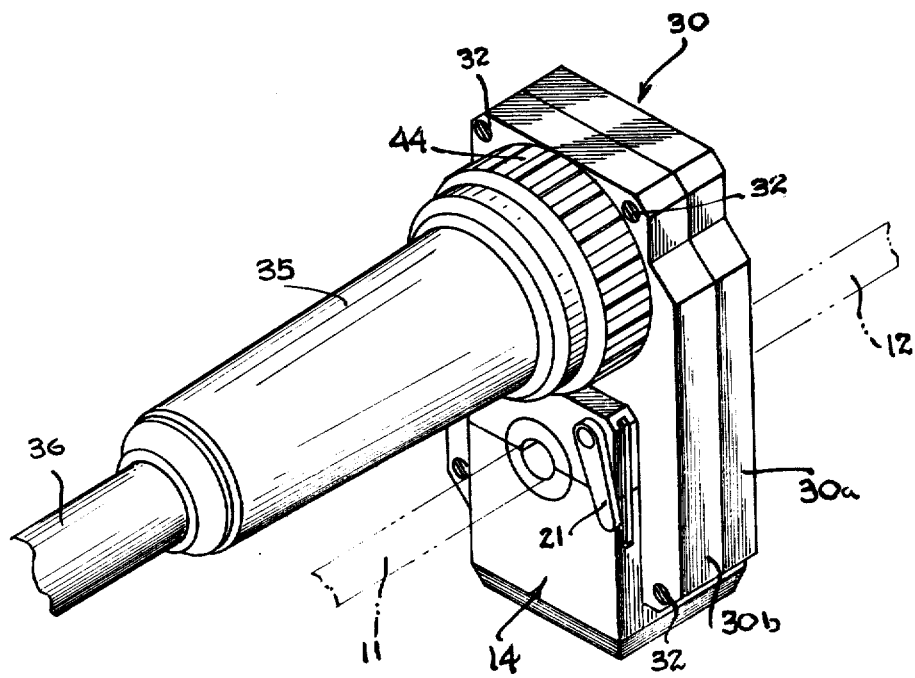
FIG. 1 is a perspective view illustrating a preferred embodiment of the invention.

Referring now to FIG. 1, a preferred embodiment of the invention is perspectively illustrated.

Two pipe sections 11 and 12 to be welded together along their edges are held between the jaws of tube clamp member 14 with their edges in abutment against each other.

Figure 7:
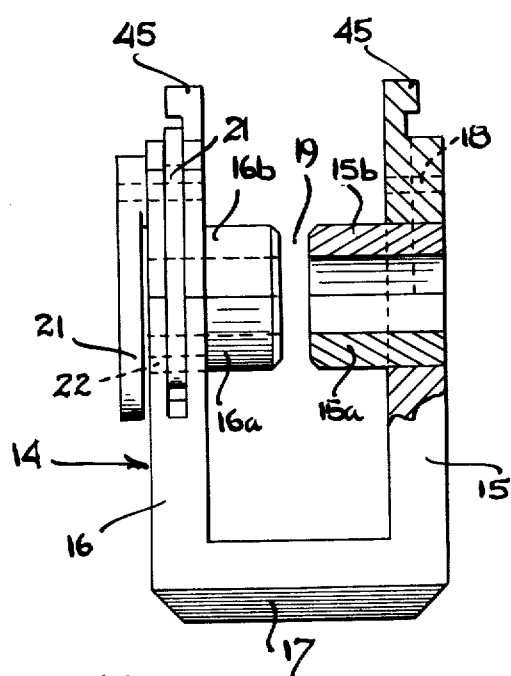
FIG. 7 is a side perspective view of the tube clamp unit of the preferred embodiment.
Figure 8:
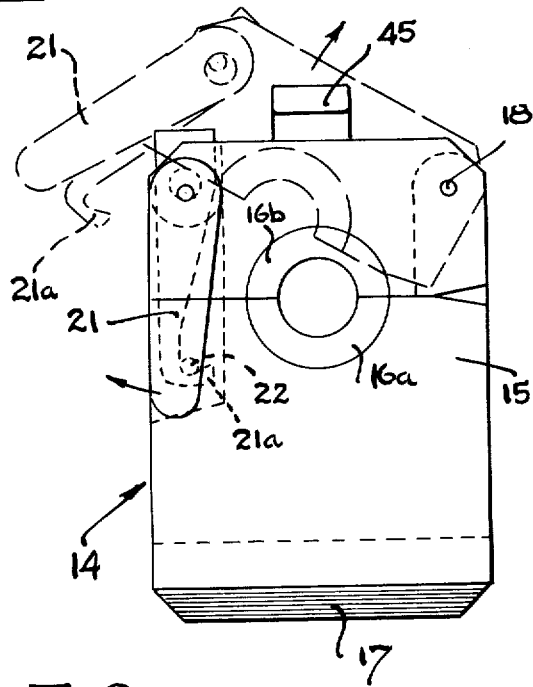
FIG. 8 is an end perspective view of the tube clamp unit of the preferred embodiment.

Tube clamp member 14, as can best be seen in FIGS. 7 and 8, is generally U-shaped and has a pair of arms 15 and 16 which extend upwardly from flat base portion 17. Each of the arms has a pair of opposing clamping jaws 15a, 15b and 16a, 16b, respectively. Each of such jaws is pivotally mounted on a hinge pin 18 on one end thereof so that the jaws can be opened as indicated by the dotted line portions shown in FIG. 8 and with the tubing sections 11 and 12 placed in position between the jaws with their ends in abutment against each other in the space 19 between the longitudinal extent of the jaws can be lowered as indicated in the solid line portions of FIG. 8 and latched in clamping engagement against the tubing sections by means of toggle arms 21 which are pivotally mounted on the upper jaw of each pair of jaws and which have toggles 21a at the ends thereof which matingly engage pins 22 on the lower jaw portions. In this manner, the tube sections can be tightly clamped together for welding in a rapid easy operation and can just as easily be released once the welding has been completed.

Figure 4:
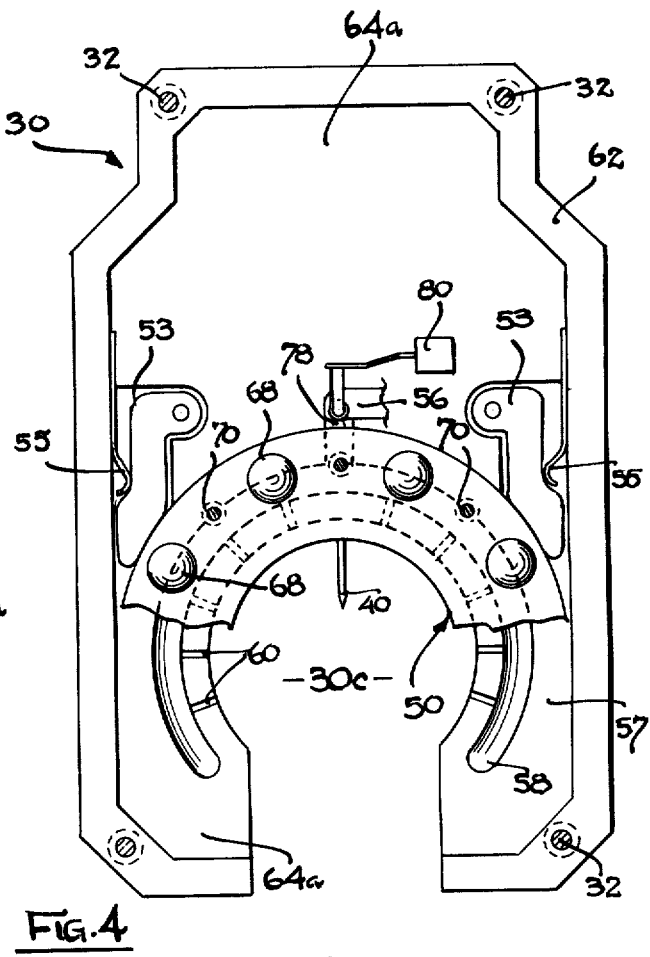
FIG. 4 is a cross-sectional view taken along the plane indicated by 4—4 in FIG. 2.

Welding unit 30 has a housing formed in two mating pieces 30a and 30b which are joined together by screws 32. The outer portion of the housing is made of an electrically non-conductive material such as a suitable plastic. Welding unit 30 is in the form of a cassette which has an electrical drive motor 35 mounted thereon, this motor receiving power from cable 36. As can best be seen in FIGS. 2 and 3, the drive shaft 35a of motor 35 is coupled by means of a bushing 43 to the drive shaft of input gear 37 of a gear train which also includes gears 38, 39, 40, 41 and 42, which, as to be explained further on in the specification, are employed to orbitally drive the welding electrode around the interface of the tube sections to be welded together. As can best be seen in FIGS. 3 and 4, cassette 30 has a large opening 30c in the bottom portion thereof in the general shape of a keyhole. The cassette is installed between the arms 15 and 16 of the tubing clamp with the inwardly extending jaw portions of the clamp fitted in the space 30c and with the welding electrode 40 in close proximity and directly opposite the interface between the two tube sections to be welded together. In such installed position, cassette 30 is latched to the tube clamp by means of locking ring 44 which has an opening therein into which L-shaped latching member 45 fits and with rotation of clamping ring 44 engages the lip of the ring to latch the cassette to the clamping member as best can be seen in FIG. 2A.

Referring to FIGS. 3–6, the drive mechanism for the welding electrode 40 will now be described. Horseshoe shaped electrode drive member 50 is formed in two half sections 50a and 50b which are joined together by machine screws 70. Section 50a has a gear ring 42 running around its outer periphery which engages gears 39 and 41. Drive member 50 is rotatably driven by motor 35 through the gear train comprising gears 38–42. The pair of gears 39 and 41 are provided to assure continuous drive of gear 42 when the horseshoe member is rotated to its upward position opposite opening 30c, i.e., at least one of the gears 39 or 41 will always be engaging gear 42 during this portion of the rotation cycle.

Welding electrode 40 is fixedly mounted on drive member 50 at the center thereof, this drive member being of an electrically conductive metal. Welding current is supplied to drive member 50 and thus to welding electrode 40 by means of brushes 53 which are pivotally mounted on metal portion 64a of the housing of cassette 30 and are connected to the current excitation source through electrical leads (not shown) running to the brushes from cable 36. Brushes 53 are resiliently urged against an outer wall of drive member 50 by means of leaf springs 55 which abut near one end thereof against the metal housing portion 64a of the cassette and the other thereof against the rear portion of the brushes. Thus, the drive member 50 and the metal portions 64a and 64b of the housing are all kept at the electrical potential to minimize the chances of arcing. An inert gas is fed through line 56 to channel 58 which is formed in plastic housing portions 30a and 30b and thence through slots 60, also formed in these housing portions, to the area of the welding electrode 40 to facilitate welding per techniques well known in the art.

As already noted, the cassette 30 is formed in two pieces 30a and 30b which are joined together by screws 32 to form an integral unit. The outer housing portion 62 of the cassette is of a suitable durable electrically insulative material such as a high impact plastic. The metal housing plate is mounted in the plastic housing and supports the gear train and the drive member 50, this metal plate also being formed in two mating sections 64a and 64b which are associated with housing portions 30a and 30b, respectively, as can best be seen in FIGS. 5 and 6. Each of plates 64a and 64b has a channel 66 formed therein which form arcuate raceways for the ball bearing members 68 of the drive member 50 which carries the welding electrode. As can be seen best in FIGS. 5 and 6, drive member 50 is formed from a pair of plates 50a and 50b which are joined together by machine screws 70. Balls 68 are mounted in pairs which abut against each other and are retained in cavities 73 formed in drive members 50a and 50b. This facilitates the assembly of the device, the openings of cavities 73 being smaller than the diameter of the balls 68 such that on assembly the balls are retained in the slots.

Referring to FIG. 3, the device is operated as follows: With welding current being supplied to electrode 40 and inert gas being fed to the region of the electrode, motor 35 is energized to drive the gear train which includes gears 37–42. Electrode drive member 50 is thus rotatably driven on the bearings formed by balls 68 which ride in their respective raceways 66. The electrode 40 is thus driven in an orbital path around the interface between tube sections 11 and 12 to be welded together, thereby effecting the welding action. As already noted, complete rotation of the drive member despite the opening 30c is enabled by virtue of the paired drive gears 39 and 41, at least one of which is always engaging gear 42. An indexing or homing cam 78 is provided on the outer surface of drive member, this cam actuating limit switch 80 when a complete rotation of the drive member has been completed, the limit switch then operating to remove power from drive motor 35.

Figure 9:
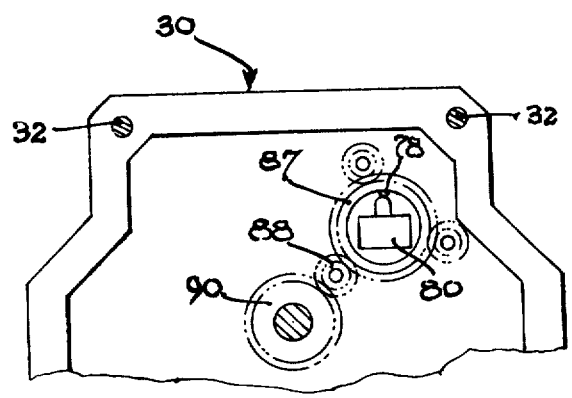
FIG. 9 is a schematic drawing illustrating an alternate implementation of the position indexing mechanism of the preferred embodiment.
Figure 5:
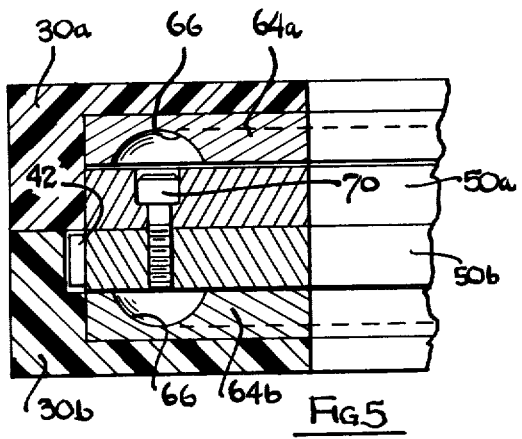
FIG. 5 is a cross-sectional view taken along the plane indicated by 5—5 in FIG. 3.
Figure 6:
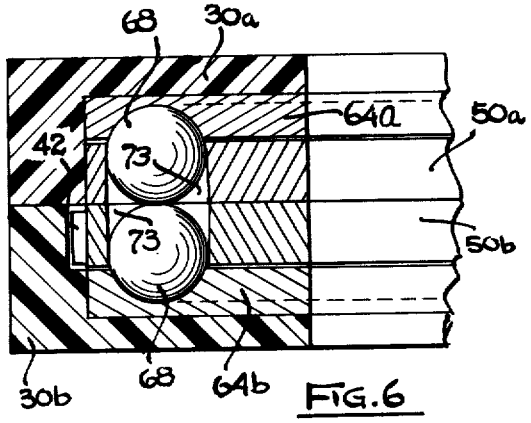
FIG. 6 is a cross-sectional view taken along the plane indicated by 6—6 in FIG. 3.

Referring now to FIG. 9, an alternative configuration for implementing the indexing switch is illustrated. In this instance, the limit switch 80 is actuated by a separate ring gear 87 which has cam 78 formed along its inner arcuate wall. Ring gear 87 is coupled through gear 88 to gear 90, which in turn is coupled to the drive shaft of the motor, the ratios of the various gears being designed so that cam 78 will return to its original starting position after one complete rotation of drive member 50. As for the previous implementation, when this position is reached, limit switch 80 is actuated to deactivate the motor drive. This alternate configuration has certain advantages in the packaging of the unit in enabling the mounting of the limit switch in a position away from the somewhat congested central portion of the device.

It is to be noted that the device is designed to enable attachment of the cassette to the tube clamping member, either from the left-hand side as shown from the right-hand side, there being an additional latching member 45 provided on the right-hand side of the clamping member to facilitate such alternative attachment.

While the invention has been described and illustrated in detail, it is to be clearly understood that this is intended by way of illustration and example only and is not to be taken by way of limitation, the spirit and scope of this invention being limited only by the terms of the following claims.

I claim:

1. In a welding device for welding together tubing sections or the like and having a tube clamping unit for clamping said tube sections together with their edges in abutment against each other, a cassette type welding unit carrying the welding electrode which can be removably joined to said clamping unit with the welding electrode directly opposite the interface between said tubing sections and means for rotatably driving the electrode in an orbital path around the interface between the tubing sections, the improvement comprising a drive member fabricated of an electrically conductive material, the electrode being mounted on said drive member in electrical contact therewith, said drive member being horseshoe shaped and having a plurality of paired balls seated therein in opposing relationship, said balls protruding from the opposite surfaces of said drive member to form bearings therefor, a housing forming a cassette rotatably supporting said drive member, said housing having an outer portion fabricated of an electrically non-conductive material and an inner portion in the form of a plate member fixedly mounted in said outer portion, said inner portion having a pair of oppositely positioned raceways in which the paired balls of said drive member ride, a drive motor, gear train means for coupling the drive shaft assembly of said drive member to said drive motor, brush means for coupling welding current to said drive member and thence to said welding electrode, homing switch means for disconnecting power to said drive motor when said drive means has completed a predetermined orbital rotation, and clamping means for removably connecting the welding unit to the clamping unit.

2. The device of claim 1 wherein said plate member has slots formed therein and a channel in fluid communication with said slots, said slots outletting to the region of said welding head, and tube means coupled to said channel for conveying in inert gas thereto.

3. The device of claim 1 wherein said drive member is fabricated in two similar opposing pieces, cavities being formed in said pieces having openings smaller than the diameter of the balls whereby the paired balls can be inserted in said cavities in abutment with each other prior to the joinder of said two sections together to form an integral unit.

4. The device of claim 1 wherein said clamping member comprises two pairs of jaws joined together by a hinge pin and an arm member having a toggle thereon for forcing each of said pairs of jaws together in clamping engagement with the tube sections to be welded together.

5. The device of claim 1 wherein said means for removably clamping the welding unit to the tube clamping unit comprises a lock ring having an opening therein, said lock ring being mounted on the drive motor housing and a latching member on the tube clamping member which engages said locking ring.

6. The device of claim 1 wherein the inner portion of the housing is fabricated of an electrically conductive metal.

7. The device of claim 1 or 6 wherein the inner and outer portions of the housing are formed from pairs of similar mating units joined together to form integral units.

8. The device of claim 6 wherein said brush means comprises a pair of brushes mounted on the inner portion of the housing and means for resiliently urging said brushes against said drive member.

* * * * *